(12) United States Patent
Celniker et al.

(10) Patent No.: US 6,369,815 B1
(45) Date of Patent: Apr. 9, 2002

(54) DEFORMABLE MODELING USING GENERALIZED CURVE CONSTRAINTS

(75) Inventors: George Celniker, Austin, TX (US); Richard M. Sowar; John H. Sloan, IV, both of Boulder, CO (US)

(73) Assignee: Spatial Technology, Inc., Boulder, CO (US)

( * ) Notice: Subject to any disclaimer, the term of this patent is extended or adjusted under 35 U.S.C. 154(b) by 0 days.

(21) Appl. No.: 09/299,037

(22) Filed: Apr. 23, 1999

(51) Int. Cl.$^7$ ............................................. G06T 17/00
(52) U.S. Cl. ........................................ 345/420; 345/429
(58) Field of Search ................................ 345/418, 419, 345/420, 421, 423, 424, 425, 428, 429

(56) References Cited

U.S. PATENT DOCUMENTS

| | | | |
|---|---|---|---|
| 4,821,214 A | 4/1989 | Sederberg | 364/522 |
| 5,559,901 A | 9/1996 | Lobregt | 382/256 |
| 5,566,281 A | 10/1996 | Tokumasu et al. | 395/120 |
| 5,751,931 A * | 5/1998 | Cox et al. | 345/420 |
| 5,929,858 A * | 7/1999 | Shibata et al. | 345/418 |
| 6,249,284 B1 * | 6/2001 | Bogdan | 345/357 |

OTHER PUBLICATIONS

ShapeWright: Finite Element Based Free–Form Shape Design, George Celniker, Thesis, MIT Dept. of Mechanical Engineering, Sep. 1990.
Dynamic Manipulation of Triangular B–Splines, Hong Qin et al., ACM Solid Modeling, 1995, pp. 351–360.
Linear Constraints for Deformable B–Spline Surfaces, George Celniker et al., Proceedings, 1992 ACM Symposium on Interactive 3D Graphics, Apr. 1, 1992, pp. 165–170.
Hierarchical B–Spline Refinement, Forsey et al., Computer Graphics, vol. 22, No. 4, Aug. 1988, pp. 205–212.
Variational Surface Modeling, Welch et al., Computer Graphics, 26(2): pp. 157–166, 1992.
Deformable Curve and Surface Finite–Elements for Free–Form Shape Design, Celniker et al., Computer Graphics, vol. 25, No. 4, Jul. 1991, pp. 257–266.
Dynamic NURBS with Geometric Constraints for Interactive Sculpting, Terzopoulos et al., ACM Transactions on Graphics, vol. 13, No. 2, Apr. 1994, pp. 103–136.

* cited by examiner

Primary Examiner—Cliff N. Vo
(74) Attorney, Agent, or Firm—Jenner & Block, LLC

(57) ABSTRACT

For simultaneous deformations of multiple surfaces, a constraint called a link constraint is created to link two faces that are to be deformed together. The link constraint consists of a relationship between a constraint curve in each face to be deformed. The selected constraint curve may be any curve, including trimmed curves and part of a boundary curve. As the faces are deformed, the link constraint limits the deformation of the faces by acting as a zipper between the two surfaces along the selected constraint curve. For local deformations within a surface, a hierarchy is created within specific areas, known as patches, of an individual face in a model, ensuring that when a patch in the hierarchy is deformed, the deformation affects patches lower in the hierarchy than that patch, but the deformation does not affect patches higher in the hierarchy. A constraint curve known as a seam, which may be any simple closed loop curve, is used to define the relationship between a patch, known as a parent patch, and a patch directly below that patch in the hierarchy, known as a child patch. For each seam, a seam constraint is created which limits the deformation of the associated child patch and all its children by forcing the child patch to maintain connectivity with its parent patch along the seam.

30 Claims, 6 Drawing Sheets

DEFORMABLE MODELING USING GENERALIZED CURVE CONSTRAINTS

FIELD OF THE INVENTION

The invention relates to the field of Computer Aided Graphic Design (CAGD) applications, and more particularly, to deformable modeling of 2-manifold and non-manifold B-rep solid models within CAGD applications.

BACKGROUND OF THE INVENTION

Deformable modeling of single surfaces in solid model CAGD applications is well known in the art. For example, George Celniker, "ShapeWright: Finite Element Based Free-Form Shape Design", M.I.T. Ph.D. Thesis, Department of Mechanical Engineering, September 1990 ("[Celniker 90]") defines the basic notion of using a simulation-based approach that mimics a physical system to sculpt and design free-form surfaces. The work was limited to a particular surface type, the serendipity triangular surface, and to a limited set of constraints which included only those geometric properties which were explicitly described in the surface representation. These constraints included point constraints at the vertices of the triangular mesh for position, tangent and normal properties, as well as cubic curve constraints along the edges of the triangular mesh. The approach did not support trimmed curve constraints or a general approach to representing surfaces. George Celniker and Will Welch, "Linear Constraints for Deformable B-Spline Surfaces", Proceedings of the 1992 Symposium on Interactive 3D Graphics, Cambridge Mass., Mar. 29,–Apr. 1, 1992 ("[Celniker 92]") describes the extension of [Celniker 90] to B-Spline and NURB surfaces as well as trimmed curve constraints. These references do not describe methods for local or multiple-surface deformations.

Local deformation using hierarchical patches is also known in the art. Forsey, D. and Bartels, R. "Hierarchical B-Spline Refinement", Computer Graphics 22, 4, pages 205–212, August 1988 ("[Forsey 88]") describes the notion of using hierarchical B-Spline and NURB surfaces to capture a local deformation capability. This work was limited to attaching child patches to a parent along the outer perimeter of the child patch. This limits this approach to supporting local deformations that occur within a rectangular region. W. Welch and A. Witkin, "Variational Surface Modeling", Computer Graphics, 26(2): 157–166, 1992 ("[Welch 92]") also demonstrates the use of deformable hierarchical patches but is similarly limited to rectangular patches along the outer perimeter of the child patch.

Neither [Forsey 88] nor [Welch 92] supports local deformations whose boundaries can be of any simple closed curve shape.

Simultaneous deformation of deformable multiple surfaces in a mesh of surfaces is also known in the art. [Welch 92] describes modeling in a B-rep solid modeling context with curve tracking that incorporates a multi-surface deformation. In [Welch 92], however, the surfaces being deformed do not load one another; instead, [Welch 92] requires that the curve constraint be shaped and then both surfaces deform to fit the curve. [Welch 92] is also restricted to curve constraints along an entire boundary of a surface.

In more recent developments, Hong Qin and Demetri Terzopolous, "Dynamic Manipulation of Triangular B-Splines", Proceedings of the Third Symposium on Solid Modeling and Applications, Salt Lake City, Utah, May 17–19 1995("[Qin 95]") shows an extension of the deformable modeling concepts to triangular B-spline surfaces and to the application of deformable modeling to solid model representations. This work also demonstrates the use of multi-surface deformations in and out of a solid modeling context. The deformable modeling multi-surface approach described in [Qin 95] uses a simple constraint mechanism to connect multiple patches into one large deformation network. This approach limits the nature of the meshes that can be deformed. Every edge within the mesh has to bound to one complete side of a triangular patch.

Neither [Welch 92] nor [Qin 95] supports a more general constraint mechanism used to connect the individual patches which would allow 'T' and '+' style intersections within the mesh as well as supporting mesh edges which map to trimmed patch edges.

Because of the limitations of existing deformable modeling applications, there exists a continuing need to allow deformation in CAGD applications involving more flexible curve constraint mechanisms.

SUMMARY OF THE INVENTION

The present invention overcomes the limitations of the prior art by providing methods for deforming solid models in CAGD applications using a general curve constraint mechanism.

It is an object of this invention to allow local deformation within a surface by using hierarchical patches and a seam constraint to connect parent and child patches within a patch hierarchy. Deformable modeling is a global operation. Any change applied to the parameters of the problem will modify the shape of the entire curve or surface. In many design situations there is a need for a local operator. Consider the example of a car door design. Once a designer has created the shape of the door, the designer may want to add a small pocket to make room for a flush door handle. The end user will not want to modify the shape of the door while inserting this local feature shape. To support local deformations, we augment the deformable modeling algorithm with hierarchical curves and surfaces connected together with a set of curve constraints known as seam constraints.

A hierarchical curve or surface is a single shape that is represented by a set of hierarchically organized shapes. As an example, think of the front panel of a shirt that has a breast pocket. The outer shape of the shirt panel is made up in pieces. For the most part, the shape of the shirt comes from the shirt's front panel. For a local region, the pocket shape defines the shape of the shirt. The pocket is connected to the panel across a seam. Along the seam, the shape of the panel and the shape of the pocket are the same. Away from the seam the shape of the panel and the shape of the pocket may vary.

A patch higher in the hierarchy, in this case the shirt front, is known as a parent patch. A patch directly below the parent patch in the hierarchy, in this case the shirt pocket, is known as a child patch. A seam constraint is used to ensure connectivity between a parent patch and a child patch during deformation. This seam constraint may be any simple closed loop curve in the domain space of both the parent and child patches.

It is a further object of this invention to allow multisurface deformation in a solid model by using a general curve constraint mechanism to link different surfaces. When working with B-rep solid models, end users will need to deform sets of faces simultaneously. We call this ability multisurface deformation. Multisurface deformation can make blends around sharp edges and corners and enable deforming a quilt of faces as if they were one single face.

The curve constraint mechanism is used to support multisurface deformations with the introduction of the idea of a link constraint. A link constraint is specified by two different curves that lie within the domain space of two different surfaces. The behavior of the constraint is to act like a zipper that connects the points along the length of the curves to one another, with various degrees of continuity. The curves represented by a link constraint can be any curves in the domain spaces of the surfaces to be deformed together, including trimmed curves, and partial edges of surfaces. This allows generalized meshes of surfaces to be deformed together, including surfaces meeting at "T"intersections and "+" intersections where the surfaces are not bounded, and also allows any number of surfaces to be linked together at a single vertex.

DETAILED DESCRIPTION OF THE INVENTION

The deformable modeling of curves and surfaces is an interactive means for sculpting free-form shapes that naturally tend to be smooth and fair. The algorithm may be applied to curve and surface representations that are commonly used in Computer Aided Geometric Design (CAGD) applications and reduces the problem of free-form shape design to the numerical problem of minimizing a set of linear or non-linear equations subject to a set of constraints. Many numerical methods are available for solving this math problem quickly enough to support the interactive sculpting of free-form shapes. Any curve or surface shape sculpted by these means is called a deformable model.

The methods discussed herein must be performed in a solid modeler. A solid modeler that is suitable for performing the methods discussed herein is ACIS® Geometric Modeler which is commercially available from Spatial Technology Inc., Boulder, Colo. ACIS® is written in C++. Specific embodiments of the invention will be discussed as using ACIS®. However, the present invention, including each of the specific embodiments described herein, may be practiced with other solid modelers.

A. Technical Background

The principal idea in deformable modeling is to give end users the ability to intuitively and easily sculpt free-form shapes by having the shapes that they are sculpting mimic the behavior of actual physical objects. The lifetime of end users' experiences in interacting with shapes that deform, like folding newspapers and stretching soap bubbles, naturally form a common foundation for helping end users to quickly and intuitively interact with deformable model curves and surfaces. Also like physically smooth shapes which are deformed, deformable model shapes tend to remain smooth and fair while they are being sculpted by the end user.

Figure 1:
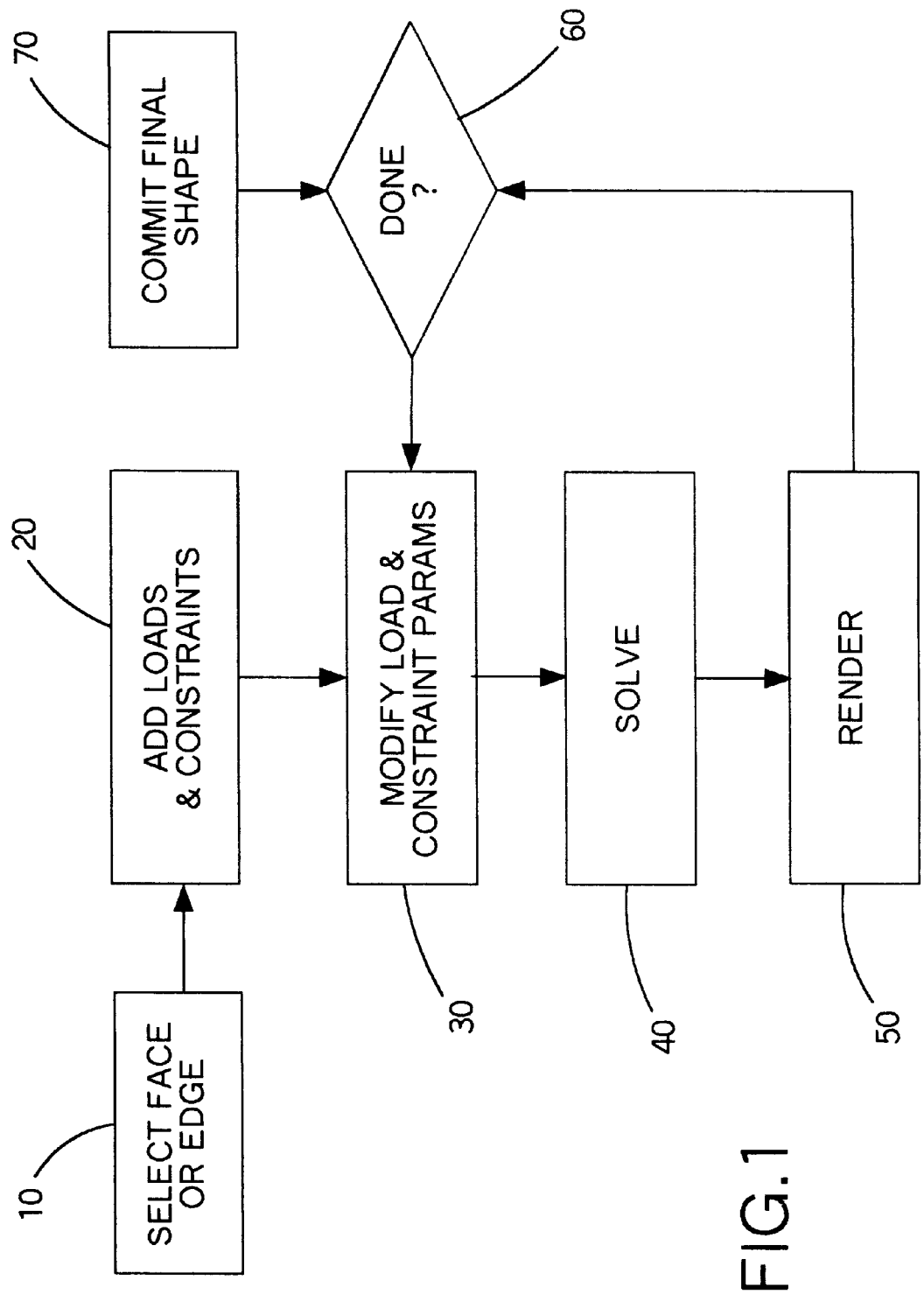
FIG. 1: Interactive sculpting loop for deformable modeling

The illusion of mimicking the deformation of physical curves and surfaces is engineered by running a computer-based time simulation of the equations of motion for the deformable model being sculpted. End users interact with the simulation by changing loads, constraints, and material properties applied to the deformable model between time steps, FIG. 1, block 20. Each time step of the simulation produces a new shape to be shown to the end user, FIG. 1 block 50. The end user may continue to modify the simulation parameters until a desired shape is achieved, FIG. 1 block 30. The basic sequence of deformable modeling interaction is shown in FIG. 1.

Figure 2:
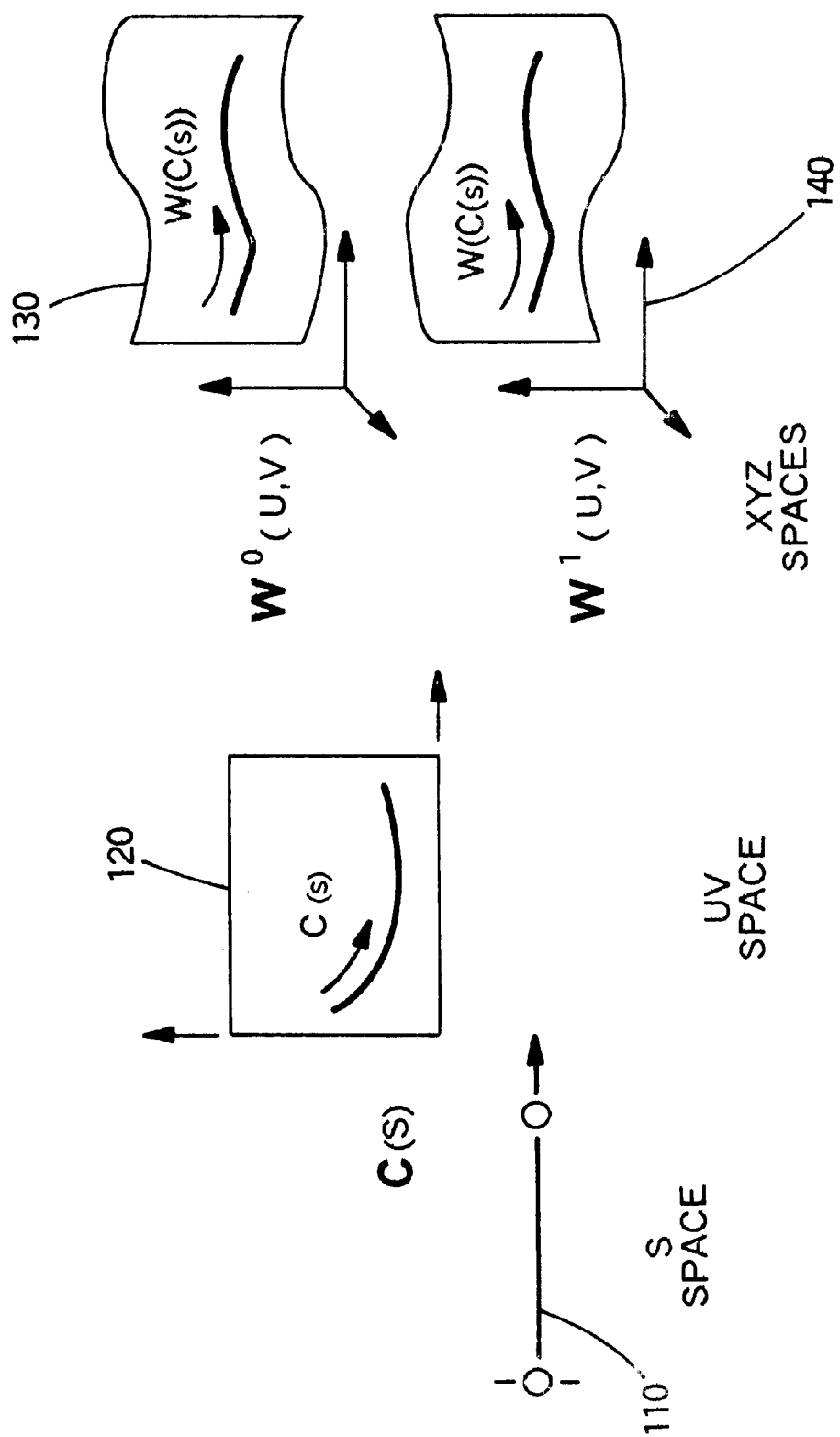
FIG. 2: The components of a curve constraint including the domain space curve and the image space curve evaluated at two different times

As shown in FIG. 2, in many CAGD applications, the shape of a curve or surface is represented as a mapping from a domain space ($R^1$ or $R^2$) 120 into an image space (Commonly $R^2$ and $R^3$ and occasionally $R^n$) 130, 140. Typically, these mappings are parameterized, that is, they are a function of a few parameters whose values determine the particular shape being represented. Any one parametric representation for a curve or surface represents a family of related shapes found by varying the parameter values of the parametric mapping. In particular, the B-spline and the NURB representations of shape are examples of such parametric mappings for curve and surface representations. For B-spline and NURB curves and surfaces the number of parameters becomes large, often ranging from 10's of parameters to 1000's of parameters; far too many for an end user to modify directly in an easy manner. The parametric form for a surface is expressed as $$W(u, v) = \begin{bmatrix} x(u, v) \\ y(u, v) \\ z(u, v) \end{bmatrix}$$

where u and v define the domain space of the surface, and the coordinates x, y, and z define the image space for the surface. Typically u and v are bounded in some way, for example, $0<=u<=1$, and $0<=v<=1$, finishing the definition of the surface's domain space.

The deformable modeling algorithm is a minimization algorithm in which the parameters of the parametric mapping are tuned to find the one curve or surface shape out of all possibly represented shapes which minimize the energy of the curve or surface. The energy is the name we give the functional which is being optimized. The form of the energy functional defines the behavior of the curve or surface. To achieve smooth curves and surfaces we choose an energy functional whose measure of energy for the surface is proportional to the amount of stretch plus the amount of bending in the curve or surface. When the energy functional is of quadratic form, we end up with a set of linear equations to solve. When the energy functional is of higher-order form, we end up with a set of non-linear equations to solve. The basic form of the energy functional is:

$$\text{energy}_{curve} = \int_\sigma \alpha(\text{stretch}) + \beta(\text{bending}) ds$$

We add to the energy functional a term that measures the work done by loads applied to the surface. Loads are user handles used by end users to quickly change shape.

Internally, loads are represented by a single vector function whose domain space is the same as the domain space of the curve or surface being edited. Externally, loads are presented to the user in terms of familiar force objects whose effects can be combined in any order. The list of loads includes point pressures, distributed pressures, point springs, curve springs, spring-sets, vector loads (gravity), and attractors (equivalent to the electrostatic charge force). Functions for force are specified below. The total applied load at any one time is simply the sum of all the applied force functions specified by an end user at run time.

Force$_{pressure-point}$(u$_0$, v$_0$)=gain*W$_n$(u$_0$, v$_0$),

Force$_{distributed-pressure}$(u, v)=gain*W$_n$(u, v), for some bounded region of u and v, Force$_{point-spring}$(u$_0$, v$_0$)=gain*(W$^0$–W(u$_0$, v$_0$)), Force$_{curve-spring}$(s)=gain*(W$^0$(s)–W(c(s))), where $$c(s) = \begin{bmatrix} u(s) \\ v(s) \end{bmatrix}$$

for some bounded region of s, $$\text{Force}_{spring-set}(u_i, v_i) = \text{gain} * \sum_i (W_i^0 - W(u_i, v_i)),$$

Force$_{vector}$(u, v)=gain*V$^0$, for all valid u and v values,

Force$_{attractor}$(u, v)=gain*(W$^0$–W(u, v))$^n$, for all valid u and v values.

Where gain=a specified scaling magnitude for the load,

W$_n$=the surface normal vector for domain point (u$_0$, v$_0$), (u$_0$, v$_0$)=a point on the surface specified by its domain space coordinates, (u, v)=specifies all the points in the domain space of the shape, W$^0$=A specified image space point, W(u$_0$, v$_0$)=a point on the surface specified by the domain point location (u$_0$, v$_0$), c(s)=a domain space curve parameterized by s.

W$_i^0$=the ith member of a set of image space points,

W(u$_i$, v$_i$)=the ith member of a set of points on the surface specified by the location (u$_i$, v$_i$), V$^0$=a given image space vector.

As can be seen from their definitions, the load function is typically a combination of point, curve, and area loads. Care has to be taken to properly integrate this function. The energy functional (shown for a curve) including a load term is specified as:

$$\text{energy}_{curve} = \frac{1}{2} \int_\sigma (\alpha W'^2 + \beta W''^2 - 2fW) du$$

where W'=the parametric derivative, dW/du,

W''=the 2$^{nd}$ order parametric derivative, d$^2$W/du$^2$, and f=the sum of all applied load force functions.

The deformable modeling algorithm is an optimization: find the one shape out of all possible shapes that minimizes the above functional given an input forcing function, f. When the forces in the forcing function do not depend on the shape of the surface, or depend linearly on the shape of the surface, we turn this problem into a set of linear equations by following Galerkin's method. When the forces in the forcing function depend non-linearly on the shape of the surface, the above functional can be minimized either by a non-linear solver or by approximating the non-linear equations into linear form and using a linear solver which can be iterated to convergence. One such approximation would be to use the current shape of the surface for some of the W terms. This linear approximation of the non-linear equations allows for greater user interactivity by providing a quicker solution.

Throughout this description, we describe one possible embodiment of the invention in which the energy functional is of quadratic form and is minimized by solving a set of linear equations. Of course, where the energy functional is of higher-order form, the energy functional is minimized by solving a set of non-linear equations, as discussed previously.

We approximate W(u,v) which can be any surface mapping with a linear sum of basis functions, as $$W(u, v) \cong \sum_{i=1}^{n} w_i * \varphi_i(u, v).$$

When working with B-splines the basis functions are just the Hermite polynomials, and the w$_i$ are just the control point locations. We substitute the approximation for $$w_i^* \phi_i(u, v)$$

shape into the energy functional yielding a quadratic energy functional of the form:

energy$_{curve}$=½X$^t$KX–X$^t$g

Where K=a [nxn] matrix with $$k_{i,j} = \alpha \int_\sigma (\varphi_i'(u, v) * \varphi_j'(u, v)) du dv + \beta \int_\sigma (\varphi_i''(u, v) * \varphi_j''(u, v)) du dv,$$

g=a [1xn] matrix with $$g_i = \int_\sigma (\varphi_i'(u, v) * f(u, v)) du dv,$$

and

X=a vector of all the w$_i$ coordinates.

The quadratic energy functional is minimized when the following set of linear or non-linear equations is solved for X:

KX=g.

The application of these equations is as follow. Again referring to FIG. 1, the end user selects a face or edge, FIG. 1 block 10, that selects the set of basis functions and the degrees of freedom in the vector X. The end user then specifies a set of load equations which results in the function, f. For each specified load function, a set of linear equations is computed in the form of KX=g. Solving for X in these equations modifies the parameters of the original surface's parametric mapping thereby deforming its shape. Any changes in the surface material properties, α and β, or in the load function, f, will change the shape of the surface after the equations are processed once again. One of the advantages of deformable modeling is that the algorithm enables the design of a free-form shape as a parameter search in a very small parameter space that is defined and explored by the end user at run time; FIG. 1, block 30.

We add the notion of constraints, FIG. 1, block 20 to turn the free-form sculpting tool described thus far into a design tool. A constraint can be used to force a set of points on the curve or surface to particular locations and geometric configurations. Another advantage of deformable modeling is that geometric constraints and deformations due to applied loads can be enforced and solved for simultaneously.

The constraints that are supported are added to the optimization problem as a set of linear equations. Sets of linear equations can be written to enforce the following geometric constraints:

At a point on a curve or surface:
   position constraint,
   tangent constraint,
   normal constraint
   curvature constraint
Along the length of a curve embedded within a surface
   position
   cross-tangent tangent properties
   cross tangent curvature properties The linear constraint for a point position constraint is given by, $$W^0(u_0, v_0) \cong \sum_{i=1}^{n} w_i * \varphi_i(s_0)$$

for curves, and $$W'^0(u_0, v_0) \cong \sum_{i=1}^{n} w_i * \varphi'_i(s_0) \text{ for curves,}$$

for surfaces, where the end user specifies the values $W^0$, $u_0$, and $v_0$.
The tangent constraint at a point equation is, $$W'^0(u_0, v_0) \cong \sum_{i=1}^{n} w_i * \left( \cos(\theta) * \frac{\partial \varphi_i}{\partial u}(u_0, v_0) + \sin(\theta) * \frac{\partial \varphi_i}{\partial v}(u_0, v_0) \right)$$

for curves, and $$W''^0(u_0, v_0) \cong \sum_{i=1}^{n} w_i * \varphi''_i(u_0, v_0),$$

for surfaces, where the end user specifies the values $W'^0$, $\theta$, $s_0$, $u_0$, and $v_0$. The angle of the tangent specified in the domain space of the surface, $\theta$, is measured from the u axis.

A curvature constraint at a point can be enforced by simultaneously enforcing the tangent constraint and the following $2^{nd}$ order parametric derivative constraint:

$$W'''^0(u_0, v_0) \cong \sum_{i=1}^{n} w_i * \left( \cos(\theta) * \frac{\partial^2 \varphi_i}{\partial u^2}(u_0, v_0) + \sin(\theta) * \frac{\partial^2 \varphi_i}{\partial v^2}(u_0, v_0) \right)$$

for curves, and $$W^0(u_0, v_0) \cong \sum_{i=1}^{n} w_i * \varphi_i(u_0, v_0)$$

surfaces, where the end-user specifies the values $W''^0$, $\theta$, $s_0$, $u_0$, and $v_0$.

A surface normal constraint is expressed by enforcing the linear constraints:

$W^0_n * W'(s_0) = 0$ for curves, and the two linear constraints $$W^0_n * \frac{\partial W(u_0, v_0)}{\partial u} = 0$$

$$W^0_n * \frac{\partial W(u_0, v_0)}{\partial v} = 0 \text{ for surfaces,}$$

where the end-user specifies the values $W^0_n$, $u_0$, and $v_0$.

The set of linear constraints needed to enforce a curve constraint are found by enforcing the constraint $$0 = \text{error} = \int_\sigma (W^0(c(s)) - W^1(c(s)))^2 ds$$

Referring to FIG. 2, this integral is the measure of the area that lies between two different curves in image space, $W^0(c(s))$ 130 and $W^1(c(s))$ 140. When the two curves are identical the value of the integral will be 0 and the constraint of making two curves be identical will be enforced. Whenever the two curves are different the value of the integral will be larger than 0. The measure of error is positive semi-definite. This means that when the constraint is satisfied the value for error will be zero, and it will also be at its minimum. The two curves that we require to be equal to one another will be the shape of the surface along the curve at the time the constraint was added, $W^0(c(s))$, and the shape of the surface along the curve after any deformation, $W^1(c(s))$. $W^0(c(s))$ is a constant while $W^1(c(s))$ contains all the unknowns of the problem. Enforcing the constraint will appear to fix the surface along this constraint curve for all future deformations. The shape of the curve constraint within the surface, c(s) 110,120, is given by the end user at run time and can be of any shape. FIG. 2 shows the basic elements of a curve constraint including, c(s) 110,120 $W^0(c(s))$ 130, and $W^1(c(s))$ 140.

The curve constraint integral is transformed into a set of linear constraints by substituting the approximation for shape into the integral equation yielding a quadratic matrix equation for the error. The minimum of the error is found by taking the partial derivative of the error equation with respect to every degree of freedom in the approximate shape representation. These operations result in a set of linear equations of the form CX=d.

Where C is an [nxn] matrix with coefficients given by, $$C_{i,j} = \int_\sigma (\varphi_i(c(s)) * \varphi_j(c(s))) ds$$

and, d=a [ixn] matrix where its coefficients are given by, $$d_i = \int_\sigma (\varphi_i(c(s)) * W^0(c(s)))ds.$$

The same approach can specify both a cross-tangent and a cross-curvature curve constraint. The cross-tangent curve error equation is $$0 = \text{error} = \int_\sigma \left( \begin{array}{c} -\sin(\theta(s)) * \frac{\partial W^0}{\partial u}(c(s)) + \cos(\theta(s)) * \frac{\partial W^0}{\partial v}(c(s)) \\ +\sin(\theta(s)) * \frac{\partial W^1}{\partial u}(c(s)) - \cos(\theta(s)) * \frac{\partial W^1}{\partial v}(c(s)) \end{array} \right)^2 ds$$

Where θ=the angle of the curve c(s) in the surface's domain space, computed as $$c(s) = \begin{bmatrix} u(s) \\ v(s) \end{bmatrix}, \text{ and } c'(s) = \begin{bmatrix} u'(s) \\ v'(s) \end{bmatrix}, \text{ and}$$

$$\cos(\theta(s)) = \frac{u'(s)}{|c'(s)|}, \text{ and } \sin(\theta(s)) = \frac{v'(s)}{|c'(s)|}.$$

The cross-curvature curve property is constrained by enforcing the cross-tangent and the following cross-$2^{nd}$ order partial derivative constraint along the length of the curve.

$$0 = \text{error} = \int_\sigma \left( \begin{array}{c} -\sin(\theta(s)) * \frac{\partial^2 W^0}{\partial u^2}(c(s)) + \cos(\theta(s)) * \frac{\partial^2 W^0}{\partial v^2}(c(s)) \\ +\sin(\theta(s)) * \frac{\partial^2 W^1}{\partial u^2}(c(s)) - \cos(\theta(s)) * \frac{\partial^2 W^1}{\partial v^2}(c(s)) \end{array} \right)^2 ds$$

Each constraint applied by the end user at run time generates one or more linear constraint equations. These can be assembled into one large constraint matrix equation, CX=d.

The C matrix is not necessarily of full rank, nor is it necessarily symmetric. Referring to FIG. 1, block 40, the math problem for deformable modeling can be stated as the matrix problem, Minimize ½$X^T K X - X^T g$ Subject to constraints CX=d.

There are many techniques for solving this math optimization problem. In this implementation the solution follows the general outline as described below.

1. Execute a pseudo-inverse on the CX=d equations to yield:

$$\begin{bmatrix} I & -D_0 \\ 0 & 0 \end{bmatrix} \begin{bmatrix} X_e \\ Y \end{bmatrix} = \begin{bmatrix} d_1 \\ 0 \end{bmatrix}.$$

2. Rewrite X in terms of the subset vector Y.

$$[X] = \begin{bmatrix} X_e \\ Y \end{bmatrix} = \begin{bmatrix} D_0 \\ I \end{bmatrix} [Y] + \begin{bmatrix} d_1 \\ 0 \end{bmatrix}.$$

3. Substitute the definition for X generated above into the quadratic matrix function to be minimized. This is a projection of the minimization function into the null space of the constraint matrix, C. The new quadratic equation is minimized when the following set of linear equations is solved for Y. $D_0^T K D_0 Y = D_0^T g - D_0^T K d_1$, which is a matrix equation of the form AX=b.

4. Given a solution for Y, the desired constrained solution for X can be found from the equation in step 2.

Deformable modeling can be applied to faces within a B-rep solid model. A B-rep solid model representation depicts a manifold as a set of faces connected to one another through a set of shared edges. To sculpt just one face within a B-rep solid in such a way that the deformed face continues to be connected to the rest of the solid model, a curve constraint is created for every edge that connects the face to another face in the model. (For deformable curves, point constraints are added.) During the deformation, the shape of the curve or surface is not allowed to change at the locations of the constraints. When the deformation is completed, the new curve or surface shape can be used in the old solid model, FIG. 1, block 70.

B. Local Deformation

Deformable modeling is a global operation. Any change applied to the parameters of the problem will modify the shape of the entire curve or surface. In design situations there is a need for a local operator. Consider the example of a car door design. Once a designer has created the shape of the door, the designer may want to add a small pocket to make room for a flush door handle. The end user will not want to modify the shape of the door while inserting this local feature shape. To support local deformations, we augment the deformable modeling algorithm with hierarchical curves and surfaces connected together with a set of curve constraints.

A hierarchical curve or surface is a single shape that is represented by a set of hierarchically organized shapes. As an example, think of the front panel of a shirt that has a breast pocket. The outer shape of the shirt panel is made up in pieces. For the most part, the shape of the shirt comes from the shirt's front panel. For a local region, the pocket shape defines the shape of the shirt. The pocket is connected to the panel across a seam. Along the seam, the shape of the panel and the shape of the pocket are the same. Away from the seam, the shape of the panel and the shape of the pocket may vary. In deformable modeling the three main components of this example are given the names parent patch, child patch, and seam.

Figure 3:
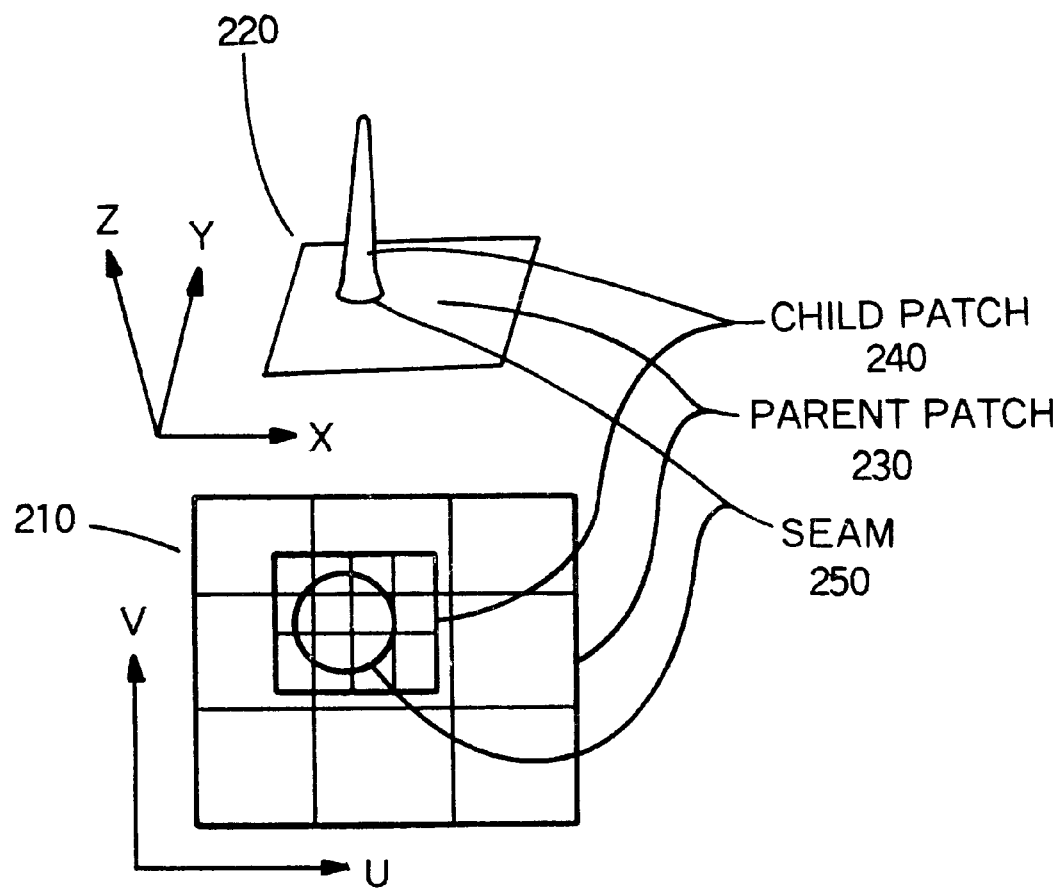
FIG. 3: The domain space and image space representation for an example parent-child patch supporting a local deformation

FIG. 3 shows the basic child-parent-seam relationship for shape. The parent patch 230 is a curve or surface that defines the domain space 210 of the shape being modeled. The child patch 240 is a second curve or surface whose domain space is a proper sub-set of the domain space of the parent patch 230. In our algorithm, there is a requirement that the domain space of the child be aligned with the parent. The child patch 240 must contain a seam 250, which is a simple closed loop curve that defines the location of a curve constraint used to force the shape of the child patch 240 to track the shape of the parent patch 250. The seam must exist in both the parent and the child patch.

Deformable modeling assigns a sense of cause and effect to the basic parent-child relationship. When the parent is deformed the shape of the seam is modified and then the shape of the child is deformed to preserve its connectivity to its parent. When the shape of the child is deformed, the shape of the seam constraint is held constant and the shape of the parent is unmodified.

The shape of the final composite surface 220 represented by the parent patch, child patch, and seam combination is made up in pieces. Outside of the seam, the shape is defined by the mapping of the parent patch. Inside the seam the shape is defined by the mapping of the child.

A hierarchy containing any number of patches can be created. Child patches of a parent patch can contain their own child patches, known as grandchild patches.

To create a local deformation, the end user adds a child patch 240 to an existing parent-patch 230, and specifies the shape of the connecting seam 250 in the domain space of the parent and child patches.

Using the power of the curve constraint mechanism, child patches can be connected to their parents with $C^0$, $C^1$, or $C^2$ continuity.

The steps involved in local deformation are:

STEP 1: OBTAIN SOLID MODEL. The method begins with a solid model description of a shape. The model may be created from scratch, by retrieving a previously stored model, or by modifying a previously stored model.

STEP 2: CREATE CONTAINMENT HIERARCHY WITHIN A SURFACE.

Substep 2-1: OBTAIN PARENT PATCH. The parent patch 230 is a curve or surface that defines the domain space of the shape being modeled 210. The parent patch may represent the domain space of an entire face within the solid model, or some proper subset of the domain space of the face being deformed.

Substep 2-2: ADD CHILD PATCH(ES) TO PARENT PATCH. The end user then specifies at least one child patch 240, where the child patch is a curve or surface whose domain space is a proper subset of the domain space of the parent patch 230.

STEP 3: CREATE SEAM CONSTRAINT BETWEEN PARENT AND CHILD PATCHES. For each child patch, the end user then creates a seam constraint 250 in the domain space of the parent and child patch connecting the child patch to the parent patch. The shape of the seam is unrestricted as long as it forms a simple closed loop. Common shapes for seams include rectangles and ellipses. Each seam acts as a curve constraint on the child patch. The image space shape of the curve constraint is specified by the parent patch.

The end user may repeat steps 1–3 as necessary to define a hierarchy of patches containing any number of levels of parent and child patch relationships, where a previously defined child patch becomes the parent patch for a lower level of the containment hierarchy.

STEP 4: ADD LOADS AND CONSTRAINTS. The end user may then modify the shape of the hierarchy by adding loads and constraints, as discussed previously.

Figure 4:
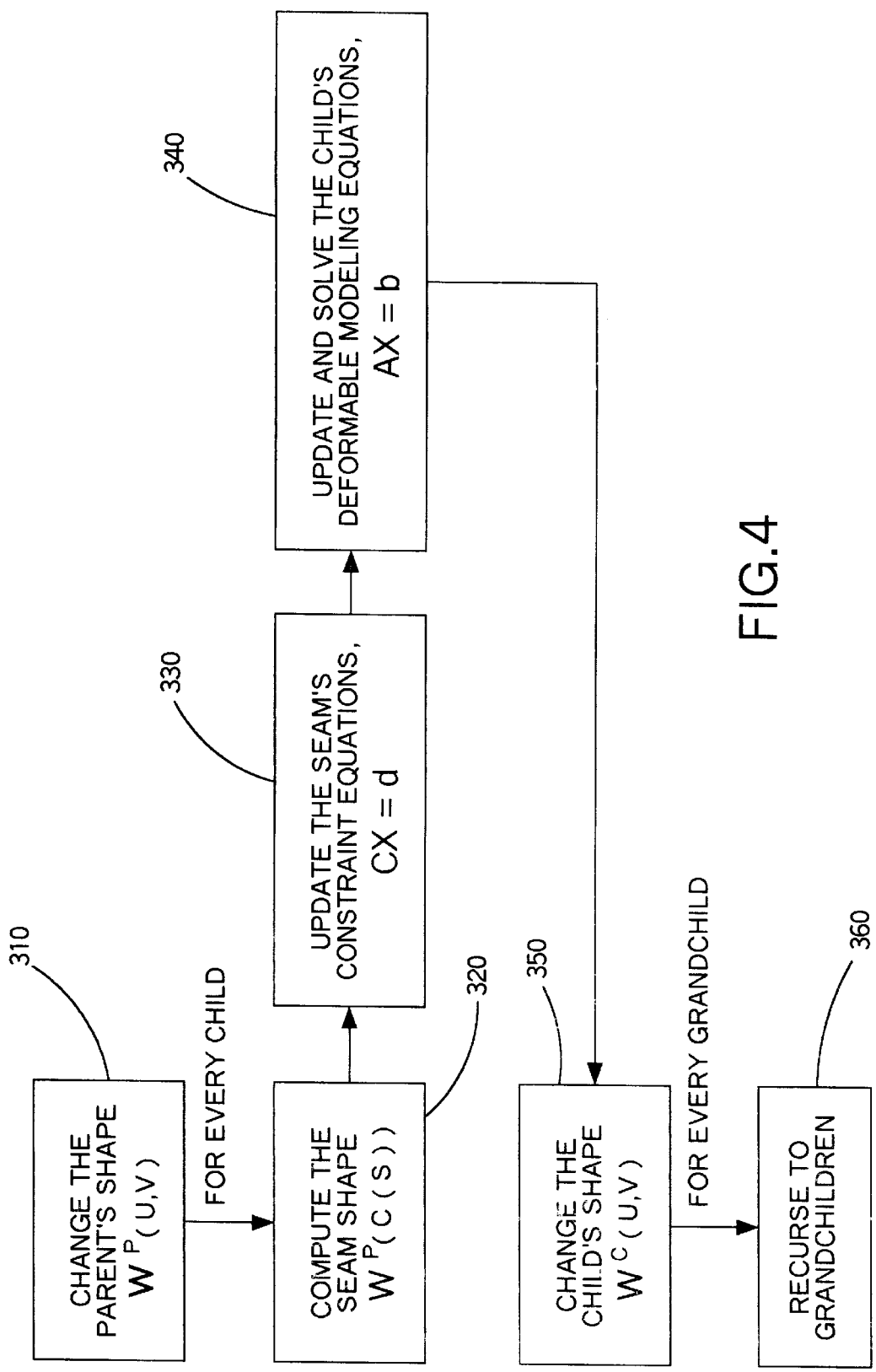
FIG. 4: Process flow for updating a deformable modeling hierarchy

STEP 5: DEFORM CONTAINMENT HIERARCHY. FIG. 4 shows the steps involved in deforming the containment hierarchy, beginning with the parent patch at the top level of the containment hierarchy.

Substep 5-1: CHANGE PARENT PATCH'S SHAPE. As shown in FIG. 4, block 310, the new shape of the parent patch $W^P(u,v)$ is determined by solving the parent patch's deformable modeling equations for the added loads and constraints, as discussed previously.

Substep 5-2: COMPUTE NEW SEAM SHAPE. For each child patch of the parent patch, the shape of the connecting seam is then computed to track the new shape of the parent patch 320. The error integral for the seam constraint has the exact same form as the previously described curve constraint mechanism, $$0 = \text{error} = \int_\sigma (W^P(c(s)) - W^C(c(s)))^2 ds$$

However, the semantics of the two projected curves are slightly different. For a curve constraint, $W^0(c(s))$ is the shape of the surface along the curve constraint at the time the curve constraint was created. For a hierarchical seam, $W^P(c(s))$ is the shape of the parent surface along the length of the constraint curve. This shape will change every time the parent's shape $W^P(u,v)$ is modified. While solving for the child's deformed shape, the shape, $W^P(c(s))$, is held constant and the constraint acts to force the shape of the child surface along the curve constraint, $W^C(c(s))$, to track the shape specified by the parent surface.

Substep 5-3: UPDATE SEAM'S CONSTRAINT EQUATIONS. The seam constraint integral is then transformed into a set of linear equations of the form CX=d, as discussed previously. See FIG. 4, block 330.

Substep 5-4: UPDATE AND SOLVE CHILD PATCH'S DEFORMABLE MODELING EQUATIONS. The child patch's deformable modeling equations are then solved subject to the constraints affecting the child patch, including the seam constraint, as discussed previously. See FIG. 4, block 340.

Substep 5-5: CHANGE CHILD PATCH'S SHAPE. The child patch shape $W^C(u,v)$ is then changed to reflect the solution of Substep 5-4. See FIG. 4, block 350.

Substep 5-6: FOR EVERY GRANDCHILD PATCH, RECURSE TO GRANDCHILDREN. If the containment hierarchy contains multiple levels of parent and child patch relationships, step 5 will be repeated using the deformed child patch as the parent patch for each child patch contained within it. See FIG. 4, block 360.

STEP 6: END? Once the hierarchy has been deformed, the new shape is then displayed to the user. If the new shape is satisfactory, FIG. 1, block 60, the end user may then commit the final shape to the solid model, FIG. 1, block 70. If the shape is not satisfactory, t he user m ay repeat the method by redefining the containment hierarchy or adding, removing or modifying loads and constraints.

C. Simultaneous Deformation of Multiple Faces

When working with B-rep solid models, end-users will need to deform sets of faces simultaneously. We call this ability multisurface deformation. Multisurface deformation can make blends around sharp edges and comers and enable deforming, a quilt of faces as if they were one single face. The steps involved in multisurface deformation are:

STEP 1: OBTAIN SOLID MODEL. The method begins with a solid model description of a shape. The model may be created from scratch, by retrieving a previously stored model, or by modifying a previously stored model.

STEP 2: CREATE LINK CONSTRAINT. The curve constraint mechanism is used to support multisurface deformations with the introduction of the idea of a link constraint.

Substep 2-1: SELECT CURVES IN EACH SURFACE. A link constraint is specified by two different curves that lie within the domain space of two different surfaces. The behavior of the constraint is to act like a zipper that connects the points along the length of the curves to one another. The curve constraint mechanism can be used to connect the surfaces with $C^0$, $C^1$, or $C^2$ continuity.

Substep 2-2: DEFINE LINK CONSTRAINT EQUATION. Once again the form of the link position constraint equation is the same as the general curve constraint equation. The forms of the cross-tangent and cross-curvature link constraints are also of the same form as the cross-tangent and cross-curvature curve constraints. The equation for the position link constraint is $$0 = \text{error} = \int_\sigma (W^A(c^A(s)) - W^B(c^B(s)))^2 ds.$$

Figure 5:
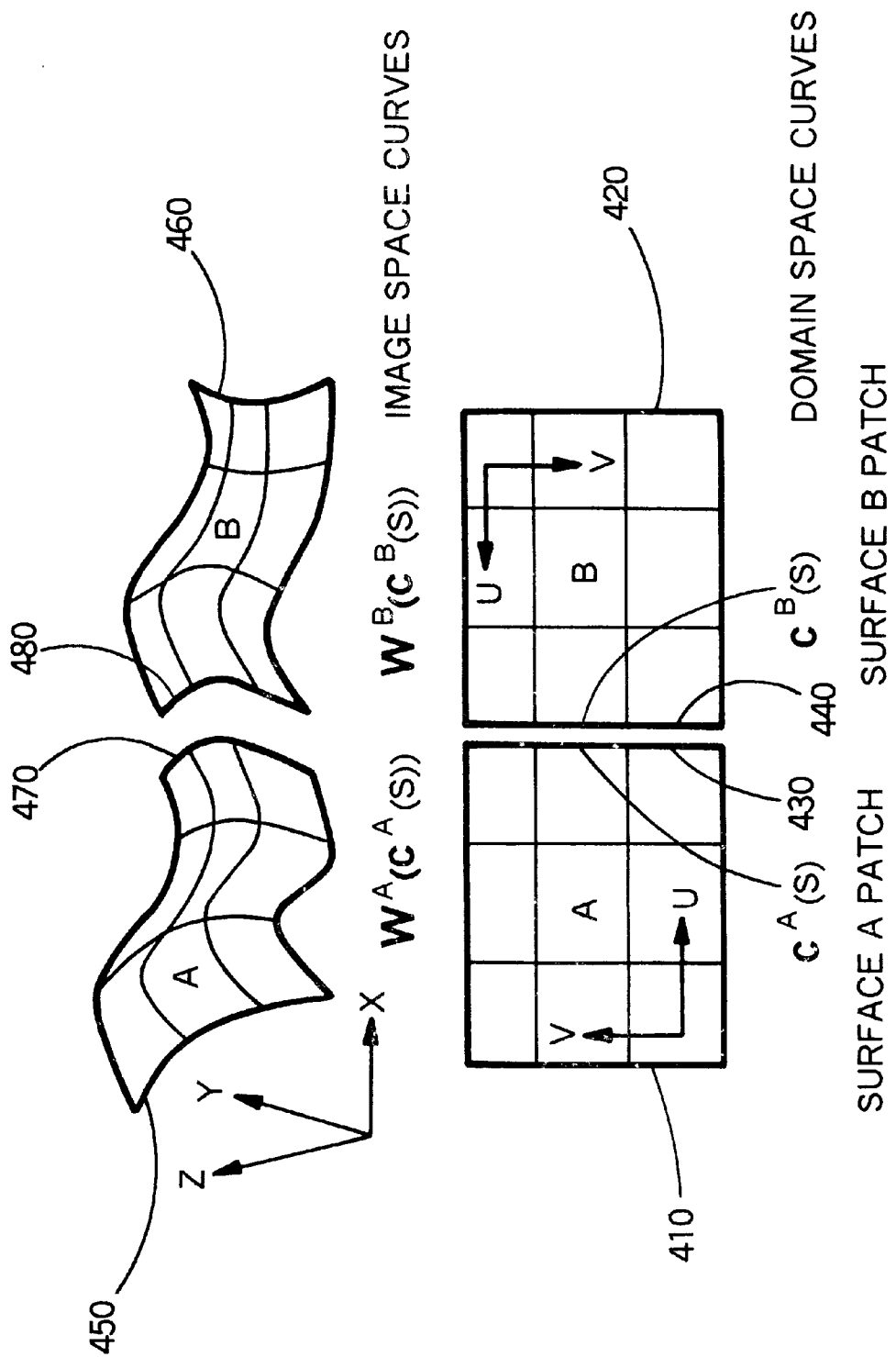
FIG. 5: Each seam constraint consists of 2 domain curves that project to two image curves on two different surfaces

But like the seam constraint the semantics of the terms within the link constraint equations are slightly different from the semantics of the terms found within the curve constraint. FIG. 5 show the basic elements of a link constraint. The curves $c^A(s)$ 430 and $C^B(s)$ 440, are two different curves that share a common parameterization in s. These two curves lie within the domains of two different surfaces. The shapes of the two surfaces, surface A 410 and surface B 420, are specified by the mappings, $W^A(u, v)$ 450 and $W^B(u, v)$ 460. The shapes of the two constraint curves on the surfaces in image space are given by the projections of the domain curve locations into image space as, $W^A(C^A(s))$ 470 and $W^B(C^B(s))$ 480.

Substep 2-3: UPDATE LINK CONSTRAINT'S CONSTRAINT EQUATIONS. The link constraint integral is then transformed into a set of linear equations of the form CX=d, as discussed previously.

STEP 3: ADD LOADS AND CONSTRAINTS. The end user may then modify the shape of the surfaces by adding loads and constraints, as discussed previously.

STEP 4: DEFORM SURFACES

Substep 4-1: UPDATE AND SOLVE DEFORMABLE MODELING EQUATIONS FOR SURFACES Given the link constraint and the deformable models for the two surfaces, a combined quadratic matrix equation set can be written, which describes the energy state for the simultaneous deformation of these two surfaces.

Minimize $½X^T K^A X - X^T g^A + ½X^T K^B X - X^T g^B$

Subject to constraints CX=0.

The X vector in these relations is now augmented to be a column vector of all the degrees of freedom in both surfaces A 410 and B 420. The $K^A$, $K^B$, $g^A$, and $g^B$ matrices are just the resulting stiffness and forcing matrices derived by treating each surface as a stand-alone deformable model. The form of the constraint matrix can be found by applying the same steps to the link constraint equation that were applied to the curve constraint equation. These steps result in a symmetric matrix, sized [(n+m)×(n+m)] where n and m are the number of degrees of freedom in surfaces A and B. The C and X matrices naturally partition into the following blocks:

$$\begin{bmatrix} C^{AA} & C^{AB} \\ C^{BA} & C^{BB} \end{bmatrix} \begin{bmatrix} X^A \\ X^B \end{bmatrix} = \begin{bmatrix} 0 \\ 0 \end{bmatrix}$$

The combined problem is easily generalized to a patch network of any number of surfaces. The same solver technique could be used on the multisurface problem as has been used on the single surface problem. However, the large degree of freedom counts expected in multisurface problems requires that some additional care be taken in the solution of these problems for performance reasons. Our implementation follows a modified iterative Gaussian elimination technique that is equivalent to a wave-front solver.

STEP 5: END? Once the surfaces have been deformed, the new shape is then displayed to the user. If the new shape is satisfactory, the end user may then commit the final shape to the solid model. If the shape is not satisfactory, the user may repeat the method by redefining the containment hierarchy or adding, removing or modifying loads and constraints.

Figure 6:
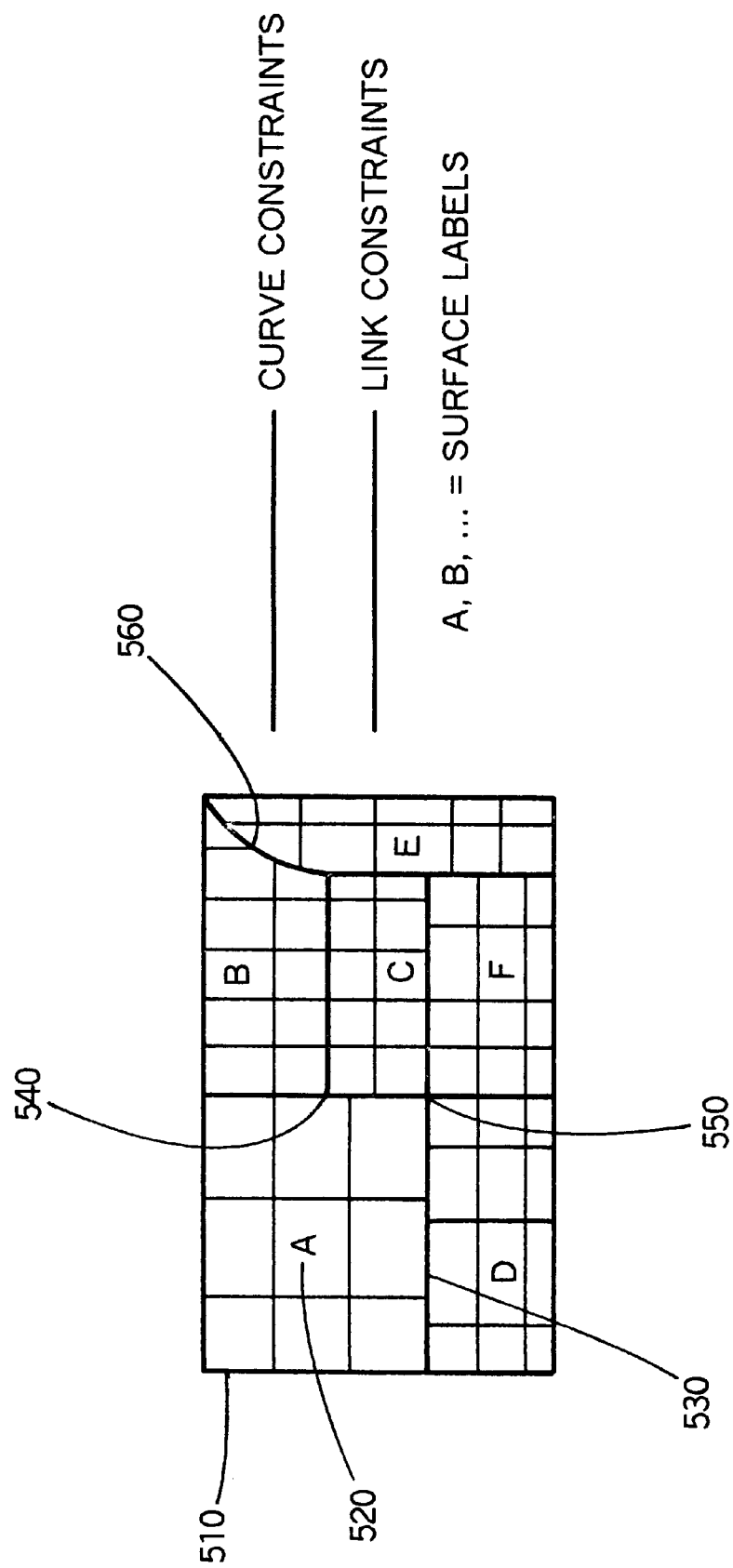
FIG. 6: An example multi-surface mesh showing: 1) "T" intersections, 2) "+" link constraint intersections; and 3) trimmed link constraints.

Representing the multisurface problem as a set of link constraints applied to a set of deformable modeling optimization problems allows us to represent very general mesh networks as shown in FIG. 6, block 510. Links may be used along the boundaries 570 or within the interior of each surface. Interior link constraints are called trimmed constraints 560. There are no parameterization requirements placed on the surfaces on either side of a seam constraint. The method applies to surfaces represented by any kind of parametric map of the form $W(u,v)=\Sigma w_i * \phi_i(u,v)$. FIG. 6 shows an example topology map of a multi-surface surface mesh 510 that demonstrates some of the generality of the topology that can be supported by this approach. Note that the link structure of the mesh supports "T" intersections 540 and "+" intersections 550 as well as trimmed constraints 560. Also note that any number of link constraints can join together at a single vertex.

When working with B-spline and NURB representations any trimmed link constraints will potentially contain tolerances due to the underlying representation. Link constraints across the outer perimeters of the B-spline and NURB surfaces will be enforced to the square root of machine precision.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosures. The scope of the invention is to be defined only by the claims appended hereto, and by their equivalents.

We claim:

1. A method for using hierarchical representations in a solid model to perform local deformations within a face by using seam constraints, said method comprising the steps of:
    a. obtaining a solid model of a shape containing one or more faces, where each face is represented by a parametric mapping from a domain space into an image space;
    b. creating a containment hierarchy within a face consisting of a parent patch and at least one level of child patches;
    c. for each child patch in the containment hierarchy, creating a seam constraint connecting the child patch and the child patch's parent, where:
        i. the seam constraint consists of any simple closed loop curve within the domain spaces of both the parent and the child patch; and
        ii. the seam constraint acts as a constraint on the child patch to force the child patch to track the shape of the parent patch;
    d. deforming the containment hierarchy, such that if a parent patch is deformed, all child patches of that parent patch are deformed to track the parent patch.

2. The method as claimed in claim 1 where at least one seam constraint is non-rectangular.

3. The method as claimed in claim 1 where the containment hierarchy contains more than one level of parent patches and child patches.

4. The method as claimed in claim 1 further comprising the step of adding at least one load, material property or constraint to at least one patch in the containment hierarchy prior to deforming the containment hierarchy.

5. The method as claimed in claim 1 further comprising the step of modifying at least one load, material property or constraint of at least one patch in the containment hierarchy prior to deforming the containment hierarchy.

6. The method as claimed in claim 1 where the faces to be deformed together are connected by $C^1$ continuity.

7. The method as claimed in claim 1 where the faces to be deformed together are connected by $C^2$ continuity.

8. The method as claimed in claim 1 where the faces to be deformed together are connected by continuity higher than $C^2$.

9. The method as claimed in claim 1 further comprising the steps of, for each seam constraint created in step (c), defining a seam constraint equation for each seam constraint.

10. The method as claimed in claim 9 where, for each parent patch, step (d) further comprises the following substeps:
   (i) Changing the shape of the parent patch;
   (ii) For each child patch of the parent patch, computing the new shape of the seam connecting the child patch and the parent patch;
   (iii) Updating and solving the child patch's deformable modeling equations; and
   (iv) Changing the child patch's shape.

11. The method as claimed in claim 9 where each seam constraint equation is expressed as an integral equation.

12. The method as claimed in claim 11 where each seam constraint equation is integrated into the deformable modeling equations of the particular seam constraint's child patch by transforming the integral equation into a set of linear equations.

13. The method as claimed in claim 1 where the end user performs the steps of defining the containment hierarchy of step (b) and defining the seam constraint of step (c).

14. The method as claimed in claim 13 further comprising the steps of:
   (e) displaying the deformed containment hierarchy to the end user; and
   (f) allowing the end user to commit the deformed containment hierarchy into the solid model.

15. A method for deforming multiple surfaces in a solid model as if they were one face by using link constraints to link faces, said method comprising the steps of:
   a. obtaining a solid model of a shape containing a plurality of faces, where each face is represented by a parametric mapping from a domain space into an image space;
   b. for every pair of faces to be deformed together that share at least a partial edge, creating a link constraint linking those two faces, where:
      i. the link constraint consists of a relationship between two curves in the separate domain spaces of each face; and
      ii. the link constraint acts as a constraint on each face to force each face to track the shape of the other face;
   c. deforming the faces linked together by the link constraints.

16. The method as claimed in claim 15 further comprising the step of adding at least one load, material property or constraint to at least one of the faces to be deformed together prior to deforming the faces.

17. The method as claimed in claim 15 further comprising the step of modifying at least one load, material property or constraint of at least one of the faces to be deformed together prior to deforming the faces.

18. The method as claimed in claim 15 further comprising the substep of, for each link constraint created in step (b), defining a link constraint equation for each link constraint.

19. The method as claimed in claim 18 where each link constraint equation is expressed as an integral equation.

20. The method as claimed in claim 19 where each link constraint equation is integrated into the deformable modeling equations of the particular link constraint's associated surfaces by transforming the integral equation into a set of linear equations.

21. The method as claimed in claim 15 where at least one of the curves selected in substep (b) is a trimmed curve.

22. The method as claimed in claim 15 where at least one face to be deformed shares only a partial edge with another face to be deformed.

23. The method as claimed in claim 15 where the faces to be deformed together are connected by $C^1$ continuity.

24. The method as claimed in claim 15 where the faces to be deformed together are connected by $C^2$ continuity.

25. The method as claimed in claim 15 where the faces to be deformed together are connected by continuity higher than $C^2$.

26. The method as claimed in claim 15 where the number of faces to be deformed together is greater than 2.

27. The method as claimed in claim 26 where the faces to be deformed together meet to form a "T" intersection.

28. The method as claimed in claim 26 where the faces to be deformed together meet to form a "+" intersection.

29. The method as claimed in claim 16 where the end user performs the steps of selecting the faces to be deformed and selecting the curves of step (b).

30. The method as claimed in claim 29 further comprising the steps of:
   (d) displaying the deformed faces to the end user; and
   (e) allowing the end user to commit the deformed faces into the solid model.

* * * * *

UNITED STATES PATENT AND TRADEMARK OFFICE
CERTIFICATE OF CORRECTION

PATENT NO. : 6,369,815 B1
DATED : April 9, 2002
INVENTOR(S) : George Celniker, Richard M. Sowar and John H. Sloan, IV It is certified that error appears in the above-identified patent and that said Letters Patent is hereby corrected as shown below:

Column 1,
Line 56, after "describes" insert -- deformable --

Column 7,
Line 34, delete the equation and insert the following:

-- $$W^o(u_o v_o) \cong \sum_{i=1}^{n} w_1 * \varphi_i(u_o, v_o)$$ --

Column 8,
Line 4, delete the equation and insert the following:

-- $$W^{''o}(u_o, v_o) \cong \sum_{i=1}^{n} w_i * \varphi_i''(u_o, v_o)$$ --

Line 8, delete "surfaces" and insert -- for curves --

Signed and Sealed this

Sixteenth Day of July, 2002

Attest:

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.     : 6,369,815 B1                                                      Page 1 of 1
DATED          : April 9, 2002
INVENTOR(S)    : George Celniker, Richard M. Sowar and John H. Sloan, IV It is certified that error appears in the above-identified patent and that said Letters Patent is hereby corrected as shown below:

Column 7,
Line 34, delete the equation and insert the following:

$$-- \quad W^0(u_0, v_0) \cong \sum_{i=1}^{n} w_i * \varphi_i(u_0, v_0) \quad --$$

Line 34, delete "for curves"
Line 44, delete the equation and insert the following:

$$-- \quad W'^0(u_0, v_0) \cong \sum_{i=1}^{n} w_i * \varphi'_i(s_0) \quad --$$

Line 50, delete the equation and insert the following:

$$-- \quad W'^0(u_0, v_0) \cong \sum_{i=1}^{n} w_i * (\cos(\theta) * \frac{\partial \varphi_i}{\partial u}(u_0, v_0) + \sin(\theta) * \frac{\partial \varphi_i}{\partial v}(u_0, v_0)) \quad --$$

Line 64, delete the equation and insert the following:

$$-- \quad W''^0(u_0, v_0) \cong \sum_{i=1}^{n} w_i * \varphi''_i(u_0, v_0) \quad --$$

Column 8,
Line 4, delete the equation and insert the following:

$$-- \quad W''^0(u_0, v_0) \cong \sum_{i=1}^{n} w_i * (\cos(\theta) * \frac{\partial^2 \varphi_i}{\partial u^2}(u_0, v_0) + \sin(\theta) * \frac{\partial^2 \varphi_i}{\partial v^2}(u_0, v_0)) \quad --$$

Signed and Sealed this

Eighth Day of July, 2003

JAMES E. ROGAN
*Director of the United States Patent and Trademark Office*